United States Patent
Hirano

(10) Patent No.: US 7,925,882 B2
(45) Date of Patent: Apr. 12, 2011

(54) DATA APPLICATION METHOD

(75) Inventor: Hideyuki Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1658 days.

(21) Appl. No.: 10/364,476

(22) Filed: Feb. 12, 2003

(65) Prior Publication Data

US 2003/0154378 A1 Aug. 14, 2003

(30) Foreign Application Priority Data

Feb. 13, 2002 (JP) ................. 2002-035903
Nov. 21, 2002 (JP) ................. 2002-337998

(51) Int. Cl.
*H04L 9/32* (2006.01)
(52) U.S. Cl. ............... 713/176; 726/26; 725/8
(58) Field of Classification Search .......... 713/176; 726/26; 725/8
See application file for complete search history.

(56) References Cited

U.S. PATENT DOCUMENTS

| | | | |
|---|---|---|---|
| 5,530,759 A | | 6/1996 | Braudaway et al. |
| 5,940,504 A | * | 8/1999 | Griswold ............ 705/59 |
| 6,185,733 B1 | * | 2/2001 | Breslau et al. ........ 717/163 |
| 6,802,077 B1 | * | 10/2004 | Schlarb ............. 725/104 |
| 2001/0004736 A1 | | 6/2001 | Hirano et al. |
| 2001/0054150 A1 | * | 12/2001 | Levy .................. 713/176 |
| 2002/0016776 A1 | * | 2/2002 | Chu et al. .............. 705/52 |
| 2002/0184158 A1 | * | 12/2002 | Tadayon et al. ......... 705/54 |
| 2003/0103645 A1 | * | 6/2003 | Levy et al. ............ 382/100 |
| 2003/0138101 A1 | * | 7/2003 | Stransky ............. 380/210 |

FOREIGN PATENT DOCUMENTS

| | | |
|---|---|---|
| EP | 1 079 627 A1 | 2/2001 |
| JP | 08-241403 | 9/1996 |
| JP | 2000-268497 | 9/2000 |
| JP | 2000-339227 | 12/2000 |
| JP | 2001-78007 | 3/2001 |
| JP | 2001-177816 | 6/2001 |
| JP | 2001-332019 | 11/2001 |
| WO | 02/073616 A1 | 9/2002 |

OTHER PUBLICATIONS

Hideyuki Hirano et al., "Concept and prototype system of copy management and protection method with proper rights", Information Processing Society of Japan Report, Feb. 21, 2001, vol. 2001, No. 15, pp. 97-102.
Hideyuki Hirano et al., "Concept and prototype system of copy management and protection method with convenience", Information Processing Society of Japan Report, Jan. 21, 2000, vol. 2000, No. 9, pp. 31-36.
Katani, Seigo et al., "Internet Security", Fujitsu, Fujitsu Limted, Jul. 13, 2001, vol. 52, No. 4, pp. 329-337.
Japanese Office Action issued Jun. 29, 2010 in corresponding Japanese Patent Application 2002-337998.

* cited by examiner

*Primary Examiner* — Christopher J Brown
(74) *Attorney, Agent, or Firm* — Staas & Halsey LLP

(57) ABSTRACT

Data application method enabling evaluations to be properly received while content is being protected, enabling content users to use only what they want to use in the amount they want to use it, and enabling advertising providers in certainty to have users use ads. The method includes: a step of converting first data for permitting use based on predetermined conditions, into encrypted first data by means of a predetermined encryption key; a step of generating watermarked second data in which the encryption key is embedded, as an invisible electronic watermark, into second data for permitting use unconditionally; and a step of compositing and distributing the encrypted first data and the watermarked second data.

13 Claims, 8 Drawing Sheets

Use Model

Use Model

Image Structure

Type 1 (Sample Image Model)

Type 2 (Replacement Model)

Test System

Type 1 (Sample Image)

Type 2 (Replacement Model)

| | User 1 | User 2 |
|---|---|---|
| Editing-permission information | Image a Image b | Image b |

DATA APPLICATION METHOD

BACKGROUND OF THE INVENTION

1. Technical Field

The present invention relates to a data distribution method for preventing unfair use of, by serving to protect rights to, digital content that includes moving images, and for associating distributed digital content with commercially oriented advertising information; and it relates to a data use device for using usable digital content based on predetermined conditions.

2. Description of Related Art

In recent years advances in infrastructure upgrading, wherein the keywords are broadband and digital broadcasting, are proceeding rapidly, and in metropolitan areas in particular, work building up fiber-optic infrastructure for "broadband access networks" is advancing. The building up of subscriber fiber-optic networks presumably will progress even more rapidly given the "e-Japan" endeavor that is a governmental objective. In environments in which users' access lines to the Internet are always connected it is possible for the users, by determining themselves whether or not to use content items while evaluating content, to subdivide content-use units into image units from packages. By affording users the opportunity to evaluate the subject matter of content, this is tied in with being able to provide a use environment in which content selection privileges are taken into consideration.

Further, likewise as with ground-wave broadcasting and digital broadcasting, in Internet broadcasting, time-consuming content such as moving pictures and streaming images enables tying in with providers of commercial advertisements and like publicity. That is, the fact that content-use status can be observed/administrated during online time means the possibility of an advertising-provider-targeted business of selling time for tie-ins with advertising providers. Given these circumstances, through commercial publicizing fees from advertising providers, content can be provided at low charge to users.

Nevertheless, because use in package units has to date been the basis of the technology for administrating moving-picture and streaming-image content, as far as use restrictions are concerned, one-time license checks prior to use have been the norm; restricting use while a user is evaluating the subject matter of content has been problematic. Consequently, absence of an environment in which users may properly evaluate the subject matter of content has been one of the factors hindering studio productivity of, and quality improvement by, content creators (such as independent labels), who have not been involved in stimulating eagerness to purchase and in vitalizing the content market.

Moreover, the business of broadcast-distributing moving-picture content carries with it the problem that establishing business models for commercial publicity is, compared with ground-wave broadcasting, difficult. The principal factor behind this would seem at the present time to be that schemes enabling tie-ins between advertising providers and content used on the Internet have not been offered.

SUMMARY OF THE INVENTION

An object of the present invention is to provide a data application method and data use device that enable receiving evaluations properly while content is being protected, that enable content users to use only what they want to use in the amount they want to use it, and that enable advertising providers in certainty to have users use ads.

A first aspect of the present invention is a data application method for distributing digital content including moving-image data. The data application method includes: a step of converting first data for permitting use based on predetermined conditions, into encrypted first data by means of a predetermined encryption key; a step of generating watermarked second data in which the encryption key is embedded, as an invisible electronic watermark, into second data for permitting use unconditionally; and a step of compositing and distributing the encrypted first data and the watermarked second data.

In the data application method as set forth in this first aspect of the invention, the first data may be encrypted with encryption keys that differ image frame by image frame, and a first encryption key with which an initial frame is encrypted may be embedded into the second data as the invisible electronic watermark; and encryption-key generation information gotten by logical operations on the encryption keys by which the second and succeeding frames are encrypted, and on the first encryption key, may be contained in image headers for each of the respective frames.

The second data in the data application method set forth in the foregoing may be advertising publicity information. In this case, the data application method may further include: a step of sending to a user use-permission information for the first data in response to payment of a charge; and a step of discounting the charge in response to a time interval, or a count of times, the second data is used.

The data application method as set forth above may further comprise: a step of verifying whether or not a user that is a distrubutee of the digital content satisfies the predetermined conditions for using the first data; and a step, based on results of verification as to whether or not the user satisfies the predetermined conditions for using the first data, of letting the user use the digital content according to an applicable use method.

According to this data application method, based on results of the verification the user may be allowed to use the first data by reproducing it.

Also according to this data application method, based on the verification outcome the user may be allowed to use the first data by editing it.

A second aspect of the invention is a data application method for distributing digital content including moving-image data, wherein the data application method includes: a step of converting first data for permitting use based on predetermined conditions, into encrypted first data by means of a predetermined encryption key; a step of generating second data for permitting use unconditionally, and third data in which the encryption key is embedded as metadata; and a step of compositing and distributing the encrypted first data, the second data and the third data.

In the data application method as set forth in this second aspect of the invention, use-privilege information that includes information as to whether permission to use the first data is granted may be included as metadata in the third data.

According to this data application method, the use-privilege information may include information as to whether reproducing the first data is allowed.

Also according to this data application method, the use-privilege information may include information as to whether editing the first data is allowed.

A third aspect of the present invention is a data use device for using digital content including encrypted first data into which first data is encrypted by means of predetermined encryption keys, and watermarked second data in which the encryption keys are embedded as invisible electronic watermarks. The data use device includes: an encryption-key extraction means for extracting encryption keys from the watermarked second data; a data decryption means for decrypting, utilizing encryption keys extracted by the encryption-key extraction means, the encrypted first data into the first data; an authentication means for verifying whether or not predetermined conditions for using the first data are met; and a data output means for causing to be executed, based on user instructions and on results of verification by the authentication means, decryption of the first data by encryption-key extraction output and the data decryption means, and for reproducing the decrypted first data as output or otherwise reproducing the second data as output.

The data use device as set forth above may further include a time-administration-information recording means for storing, in a predetermined region of data included in digital content having been distributed, time administration information based on use times or use counts for each of the data. In this case the data use device may further comprise a time-administration-information output means for outputting, in order to administrate billing, the time administration information contained in the predetermined region of the data.

In the data use device of either of the foregoing cases, the time-administration-information recording means may embed, as an invisible electronic watermark in the second data, time administration information for each of the data.

The data use device as set forth immediately above may further include a tampering detection means for comparing time administration information contained in the predetermined region of the data with reference information on use status that all the data possesses and inspecting for presence/absence of tampering.

In the data use device as set forth in the foregoing summary of the third aspect of the invention, the authentication means may access a usage monitoring server that administrates administration information including permission information for all of the data, and perform verification of the permission information by consulting the administration information on the usage monitoring server.

The data use device as set forth in the foregoing summary of the invention in a third aspect, further may comprise an editing-permission means for, based on results of verification by the authentication means, permitting editing of the first data.

A fourth aspect of the present invention is a computer program for a data use device using digital content including encrypted first data into which first data is encrypted by means of predetermined encryption keys, and watermarked second data in which the encryption keys are embedded as invisible electronic watermarks. The computer program is for causing a computer to function as a data use device including: an encryption-key extraction means for extracting encryption keys from the watermarked second data; a data decryption means for decrypting, utilizing encryption keys extracted by the encryption-key extraction means, the encrypted first data into the first data; an authentication means for verifying whether or not predetermined conditions for using the first data are met; and a data output means for causing to be executed, based on user instructions and on results of verification by the authentication means, decryption of the first data by encryption-key extraction output and the data decryption means, and for reproducing the decrypted first data as output or otherwise reproducing the second data as output.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration

A supposition in the present invention is network content business that is "viewing what one wants to at the instant one wants to, using for only as long as one wants to view, and paying only for the time one has viewed"; and the two elemental technologies below are assumed necessary to realize this.

(1) Technology for real-time content use online, based on the what content-user privileges are; and
(2) Billing technology that is tied in with the amount advertising is used.

A formula by which two types of images (encrypted, plain text) are switched in real time according to external information is proposed as element (1). Likewise, a formula in which advertising use volume is counted exactly and billing is according to the count information is proposed with regard to (2).

Figure 1:
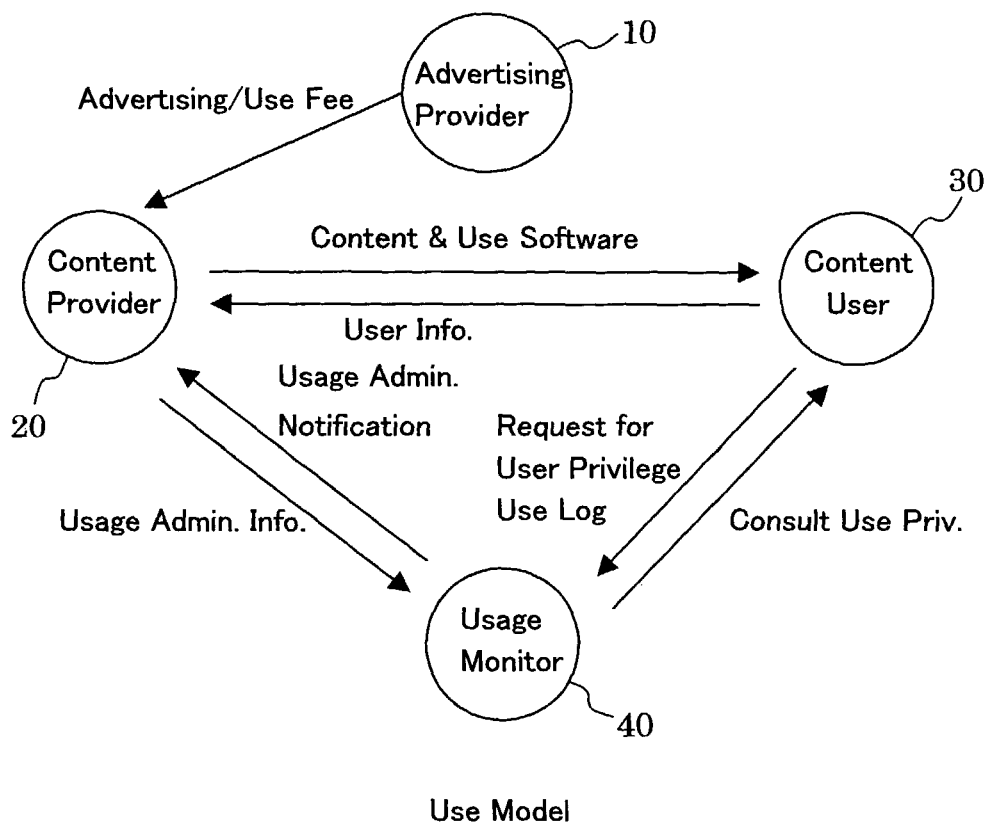
FIG. 1 is an explanatory diagram illustrating an example mode of a business model in which a first embodiment of a data application method under the present invention is adopted.

A use model (business model) for a system in which a first embodiment of a data application method under the present invention is adopted is sketched out in FIG. 1. Therein a model is rendered in which four persons, an ad provider 10, a content provider 20, a content user 30 and a usage observer 40, are hypothesized.

The ad provider 10 offers to the content provider 20 advertising publicity (commercials) containing moving image data, and ad-use fees.

After obtaining from the content user 30 user information that contains image use-range details, the content provider 20 offers content and use software to the content user 30.

Likewise, the content provider 20 offers to the usage observer 40 usage administration information containing use-privilege information generated from the image use-range information, and apprehends, according to a usage administration notification such as a time code included in all data within the content, use status of the content user 30 (time that commercials and pay images are used). Further, according to the time code or like usage administration notification and the use-privilege information, the content provider 20 administers pay-image use time, and carries out a billing process.

The usage observer 40 administers users' use statuses according to a use log, which can be the time code included in all data within the content.

The content user 30 makes a use request to the usage observer 40, and uses data in the range designated by consulted use-privilege information. If there is no use-range designation, it is made advertising use.

Rendering this sort of a configuration realizes the following.
(1) Administration of advertising use information (use time, use count, etc.) becomes possible, as does actualization of use-information storage, of statistics, and of other services in which use information is employed.
(2) Actualization, through time-code based use administration, of discount promotions for pay images in accordance with advertising use volume becomes possible.

Data Structure

Figure 2:
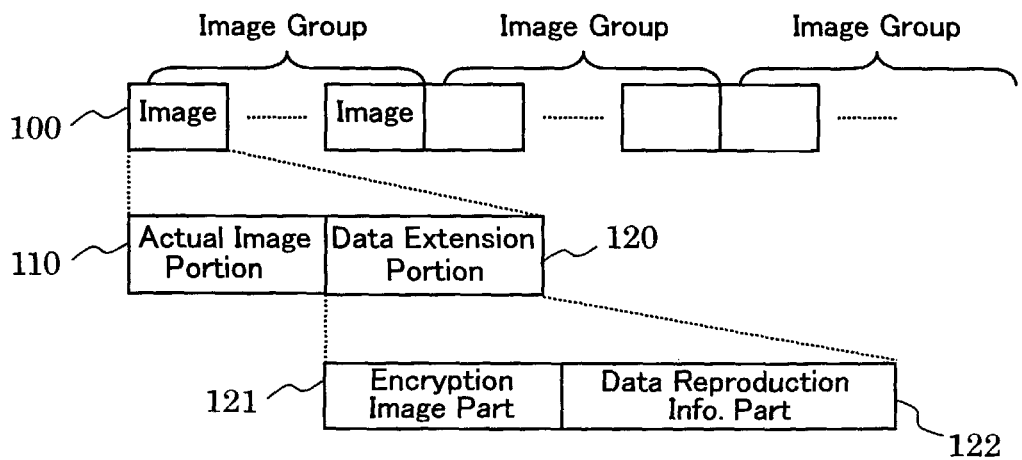
FIG. 2 is an explanatory diagram of a data configuration example for distributed digital content.

One example of a data structure utilizing a data application method under the present invention is illustrated in FIG. 2. A data group contained in distributed digital content is composed of a plurality of image data 100. Each data element 100 is composed of an actual image portion 110 and a data extension portion 120.

The actual image portion 110 contains, in a general-purpose AV data format made visible, an advertising image composed of commercial publicity information, or one part only of a pay image. The data extension portion 120 is composed of an encryption image part 121 and a data reproduction information part 122. The encryption image part 121 encrypts and stores an image that is for being restored into a pay image; the data reproduction information part 122 contains restoration information that includes image-type information on the pay image.

Figure 3:
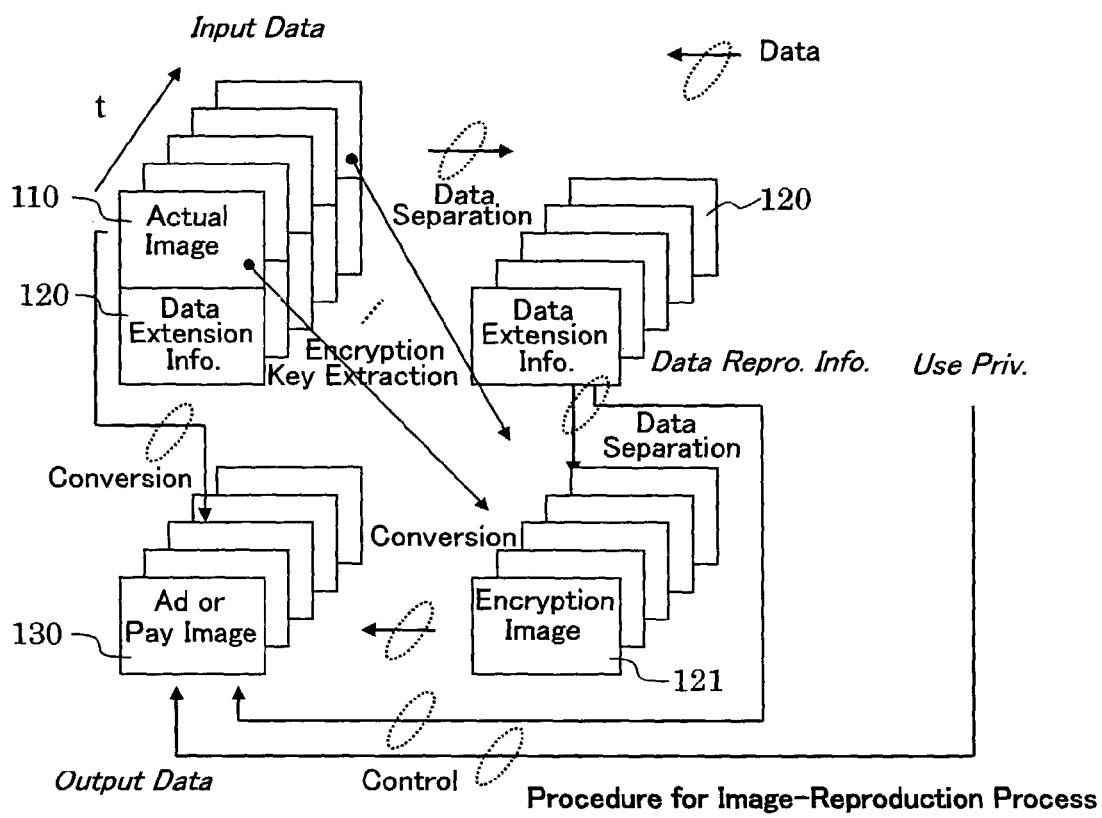
FIG. 3 is an explanatory diagram illustrating a procedure for an image reproduction process.

A procedure for an advertising-image or pay-image reproduction process is illustrated in FIG. 3.

In reproducing an image, output data (an advertising image or pay image) is generated according to input data (a protection image) and use-privilege information input from without. Which of either advertising images or pay images is to become the output process target is selected image by image according to intrinsic information for each image, such as time codes, and to information on whether use is permissible.

As indicated in FIG. 3, for each image, the input data is separated into an actual image 110 and data extension information 120, and subsequently the data extension information 120 is separated into an encryption image part 121 and a data reproduction information part 122. An encryption key is embedded by means of an invisible electronic watermark in each actual image portion 110, and the encryption key is taken out from the actual image, whereby the encrypted image stored in the encryption image part 121 is decrypted.

Then, an advertising image or encrypted pay image contained in the actual image portion 110 is generated and output based on use-privilege information. At this time, a data-conversion process, such as image compositing of the actual image with images separated/encrypted from the data extension portion 120, based on data reproduction information (image type), is executed.

Figure 5:
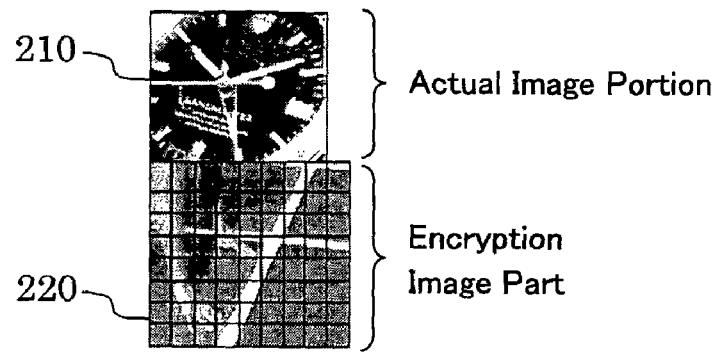
FIG. 5 is an explanatory diagram illustrating one form of an image format.
Figure 6:
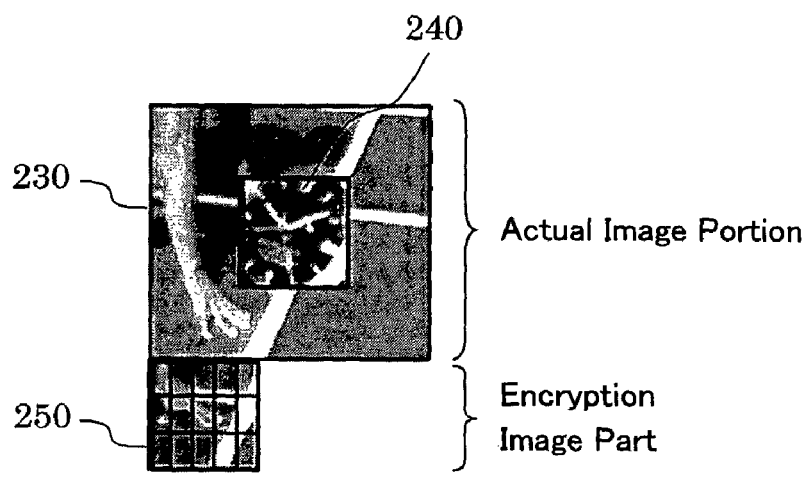
FIG. 6 is an explanatory diagram illustrating one form of an image format.

Information related to image type among the data reproduction information might be, for example, like Type 1 represented in FIG. 5, or Type 2 represented in FIG. 6.

With Type 1 represented in FIG. 5 is a model that only lets advertising image 210 contained in actual image portion 110 be used, and does not show a pay image 220. In this case, the pay image 220 is contained in encryption image part 121 as encrypted data 220 encrypted by an encryption key.

With Type 2 represented in FIG. 6 is a model in which an advertising window 240 is made in a pay image 230, and that lets both the advertising image and a portion of the pay image be used unconditionally. In this case, within the pay image 230 only that section that is located in the advertising window 240 is contained, as encrypted data 250, in the encryption image part 121.

In either Type 1 or Type 2 the two kinds of images (actual image: plain text; encryption image: encrypted) are integrated, and information on selecting Type 1, Type 2 is contained as the image type in the data reproduction information.

If the substance of use-privilege information for either Type 1 or Type 2 is "use denied," the actual image portion only is used. Likewise, if the use privilege amounts to "use allowed," with Type 1, the encrypted data contained in the encryption image part 121 is decrypted for use, and reproduced for output. With Type 2, after decrypting the encrypted data 250 that is contained in the encryption image part 121, it is composited for use into the advertising window 240 in the actual image portion 110.

Figure 4:
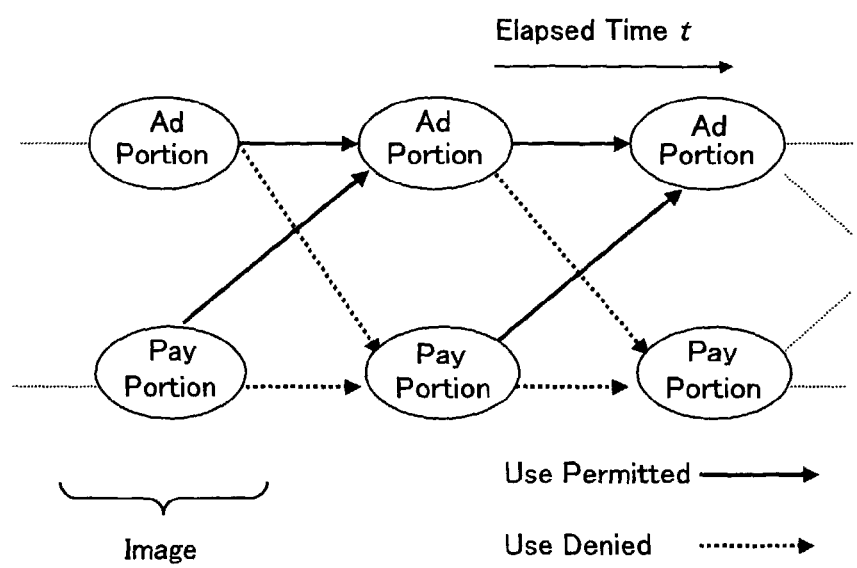
FIG. 4 is an explanatory diagram illustrating an outline of a procedure for an image reproduction process based on use-privilege information.

The distributed digital content is, as described above, made up of a plurality of images including advertisement images that form commercial publicity information, and pay images, and as indicated in FIG. 4, advertising images and pay images are switched between dynamically based on the content of the use-privilege information; when a use privilege is not held, use only of advertising images is permitted.

Content Use

In using distributed digital content with a data structure as described in the foregoing, strengthening security for pay images and realizing simultaneous restoration of images in real time are taken into consideration.
(1) Encrypt each image with encryption keys having a one-to-one (per frame) correspondence with the image data.
(2) Execute content-use administration that is made to correspond with time codes.

Image Encryption with Encryption Keys Having One-to-One Correspondences

Encrypting part or all of the pay image with an encryption key that differs from image to image strengthens prevention of the unfair use of pay images.

In concrete terms, an encryption key (e.g., 8-byte) in which the lead frame of a pay image is encrypted is embedded as an invisible electronic watermark in a lead advertising image among the advertising images. For the encryption key in which the succeeding frame of the pay image is encrypted, encryption-key relevance information obtained by means of the lead encryption key and a logical operation is generated and is stored in the header portion of the advertising image to which it corresponds.

Figure 7:
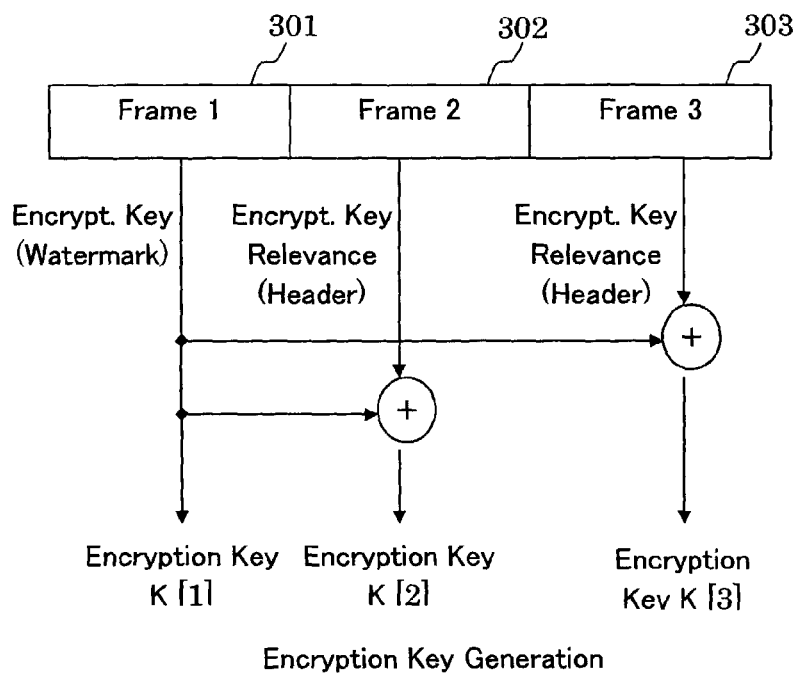
FIG. 7 is an explanatory diagram illustrating an outline of an encryption-key generation process for when a pay image is reproduced.

As shown in FIG. 7, during image use, an encryption key K[1] is extracted from the lead advertising image (first frame 301). For the succeeding frames (second frame 302, third frame 303, . . . ), the encryption-key relevance information contained in the header portion of the advertising image is extracted, and by means of this and the encryption key K[1] taken out of the lead frame, and by performing a logical operation, encryption keys K[2], K[3], . . . for decrypting each of the succeeding pay-image frames are generated.

In general the amount of watermark embedding will be dependent on the number of frames and the image bit rate, and in many cases the process of extracting the watermarks in real time is problematic. In that respect, the time that the encryption-key extraction process takes may be shortened by making the encryption key in only the lead advertising image into a watermark and embedding it, and doing a logical operation with the encryption-key relevance information taken out of the header portion and with the encryption key taken out of the lead advertising image, to generate encryption keys for the succeeding pay images—which enables carrying out the moving image reproduction process smoothly.

This method eliminates restrictions on the amount of information for the encryption keys and enables image reproduction in real time while heightening the security strength.

Content-Use Administration Correlated with Time Codes

Figure 8:
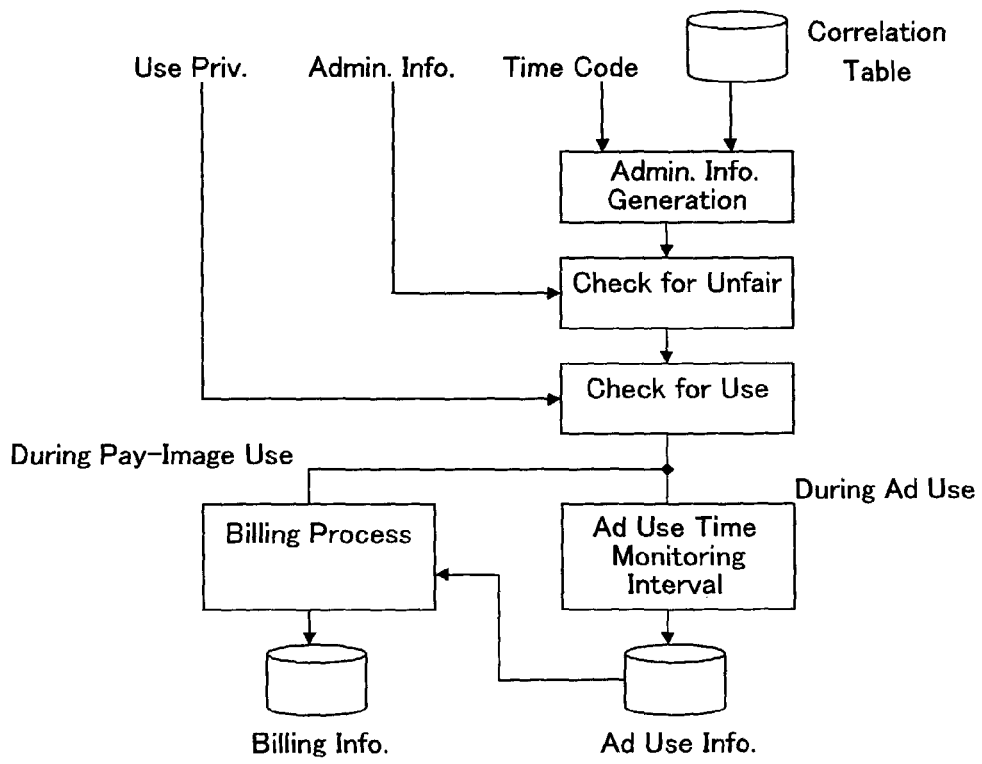
FIG. 8 is an explanatory diagram illustrating a content use-administration process.

Volume-dependent billing using time codes is conceivable as one means of administrating the content-use status of the content user 30 and measuring the content use volume. Time codes are "stamped" on each image when the image data is generated. The tasks herein are prevention of time-code tampering, and accurate content-use administration. A method that enables strengthening of security and resolves these just-noted problems is sketched out in FIG. 8.

Tampering with time codes may be prevented by embedding into the images administrative information correlated with the time codes. Time codes are generally contained in the header, wherein tampering with the data is possible. In this case, the administrative information correlated with a time code is embedded into an advertising image as an invisible electronic watermark, and when billing, the time code is checked for tampering by collating the time code with the administrative information.

Likewise, a use check is made with the time-code relevance information and the use privilege; and when an advertising image is used the use time is monitored, and when a pay image is used the billing process is done consulting advertising use information. For example, for volume-dependent billing generated using pay-image use time or use count, the billing total is determined giving discounts in accordance with the advertising-image use time or use count.

The foregoing method enables a safe, accurate billing process by image unit. Here, the administrative information and time codes, irrespective of the advertising images and pay images, are successively offered from the content user 30 to the usage monitor 40 as use logs when the content is reproduced.

Verification Test

To examine the effectiveness of this sort of protection formula for content to which advertising images are made relevant, a verification test was conducted. An image-use library in a format enabling use in Windows Media Player (registered trademark) provided by Microsoft™ was prepared. This library is one type of filter that is executable in a "Direct Show" environment, and that can use motion JPEG in AVI format. Likewise, image data with audio may be used with this library.

Figures 9, 10:
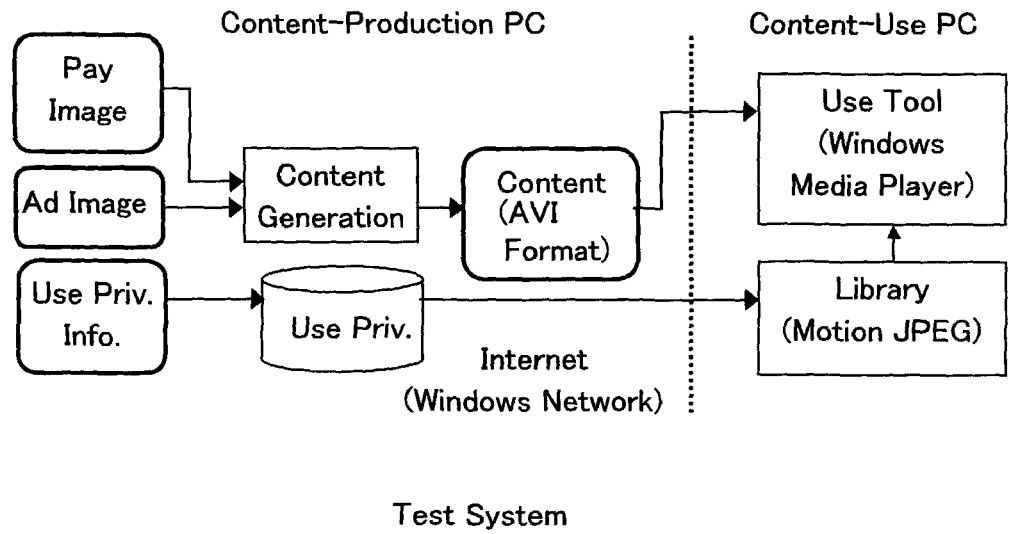
FIG. 9 is an explanatory diagram illustrating a system utilized in a verification test.
FIG. 10 is an explanatory diagram illustrating an image reproduction instance.

The test system is sketched out in FIG. 9.

Illustrated therein is a configuration in which are network-connected a content-production personal computer (PC) into which content-generating software as a content-generating application is loaded, and a content-use PC into which a use tool and the library are loaded with the object being content use.

In the content-production PC, content use-privilege information is generated and stored in a storing means as a file that can be made shareable (use privilege).

In the content-use PC, when the content use tool is selecting protected content the library acquires use-privilege information stored in the storing means in the content-production PC and executes content use.

Protection images with audio data are the subject of this test, and it confirms that pay images and advertising publicity images (commercials) may be reproduced normally with nothing wrong like missing images. The test environment is set forth in Table 1.

TABLE 1

| Test Environment | |
|---|---|
| Environment (Content-Use PC) | FMV-610GXTX6 CPU: Pentium III ™ 1 GHz OS: Windows 2000 ™ |
| Protection images (Motion JPEG) | 360 × 240 pixels/full-color data length: 32 s no. frames: 30; bit rate: 456 kbps PCM sample size: 16-bit |
| Pay Images | 360 × 240 pixels/full-color |
| Advertising Images | 100 × 100 pixels/full-color (no audio) |

Playback of pay images as well as advertising images was tested in the test environment noted above, which confirmed that the images and sound could be used normally. It was further confirmed that image playback was possible even if, as in the image-playback example in FIG. 10, the substance of the use-privilege information was changed (use permitted/use denied).

By the present invention, with the objective of realizing real-time control of content use during online time, a formula is proposed for switching, according to external information, in real time between two types of images (encrypted, plain text). Herein a privilege-protectable content data structure is devised, and a means that encrypts images with one-to-one corresponding encryption keys is realized. Likewise, a formula for billing for pay images in accordance with advertising use volume is proposed, and a content-use-administration means correlated with time codes is devised. These factors make it possible to use pay images while security strength is fortified.

Results of prototyping the present formula on and measuring the performance of two kinds of image types confirmed that wherein Motion JPEG images for which the frame rate=30, bit rate=about 500 kbps were made the target, either of the two kinds of image types were within working range. Likewise, it was verified that switching control for dynamic screens was realizable.

Other Embodiments

A) The configuration may be such that in addition to the actual image portion and data extension portion, a second data extension portion may further be provided, and encryption-key and like information may be contained as meta-data in the second extension portion. In this case, embedding encryption keys as invisible electronic watermarks in the advertising images contained in the actual image portions would be unnecessary.

Figure 11:
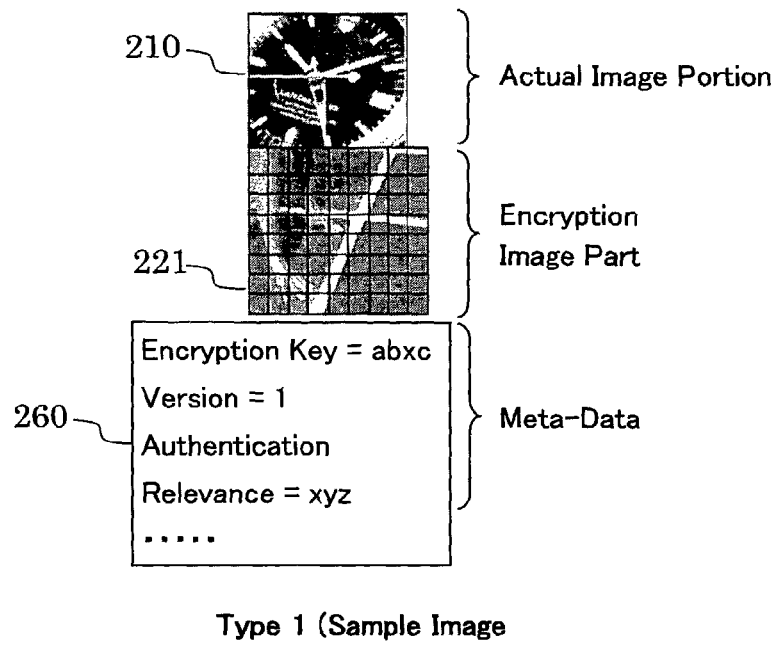
FIG. 11 is an explanatory diagram illustrating one form of an image format utilized in another embodiment.

An example in which the Type 1 data represented in FIG. 5 is put into this sort of format is represented in FIG. 11.

Therein, advertising image 210 contained in the actual image portion remains as it is, while the pay image 221 is encrypted with a predetermined encryption key and contained in the encryption image part of the data extension portion. Further, information on the encryption key, version information for the encryption logic, and authentication information is contained as the above-described data (metadata) in a second data extension portion 260.

Figure 12:
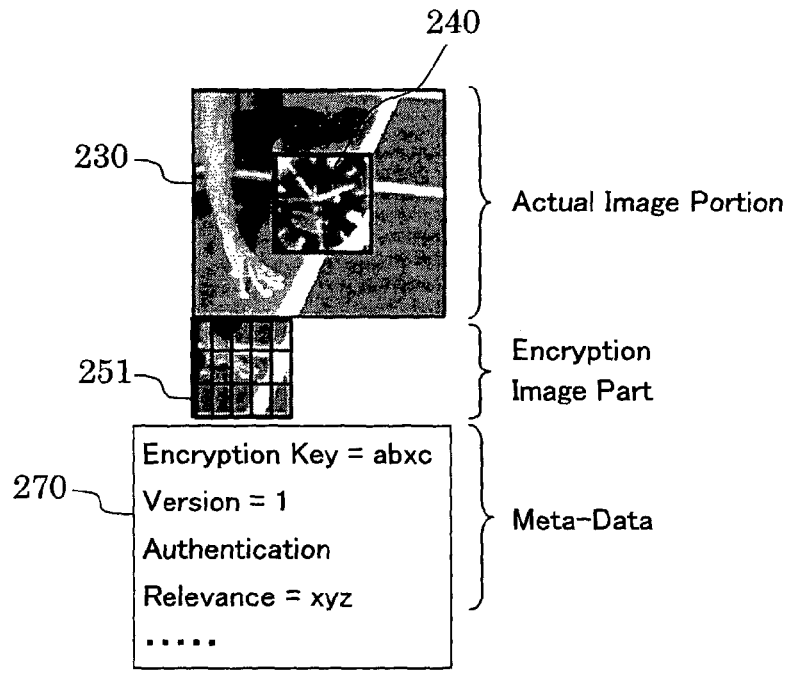
FIG. 12 is an explanatory diagram illustrating one form of an image format utilized in another embodiment.

An example in which the Type 2 data represented in FIG. 6 is put into this sort of format is represented in FIG. 12.

Therein is the model in which the advertising window 240 in the pay image 230 is made, and that lets both the advertising image and a portion of the pay image be used unconditionally, and within the pay image 230 only that section that is located in the advertising window 240 is contained, as encrypted data 251, in the encryption image part of the data extension portion. Further, information on the encryption key, version information for the encryption logic, and authentication information is contained as the above-described data (meta-data) in a second data extension portion 270.

With either Type 1 or Type 2, the actual image portion, the data extension portion, and the second data extension portion are integrated, and information on selecting between Type 1 and Type 2 is contained as the image type in the data reproduction information.

With either Type 1 or Type 2, if the substance of the use-privilege information is "use denied," only the actual image portion is used. Likewise, if the substance of the use-privilege information is "use permitted," with Type 1, the encrypted data contained in the encryption image part 121 is decrypted for use, and reproduced for output. With Type 2, after decrypting the encrypted data 250 that is contained in the encryption image part 121, it is composited for use into the advertising window 240 in the actual image portion 230.

With the distributed data, the content of the second data extension portions 260 or 270 is read out utilizing a predetermined application and based on the content is offered for a content-user's use.

B) In the embodiment described earlier, administering—as use-privilege information—information as to whether reproduction of digital content is permitted or denied controls the use of pay images in distributed digital content by controlling the reproduction of the images; but also possible is a configuration such that administering—as use-privilege information—information as to whether editing of digital content is permitted or denied controls use by controlling the editing of image data contained in the actual image portion.

Figures 13, 14:
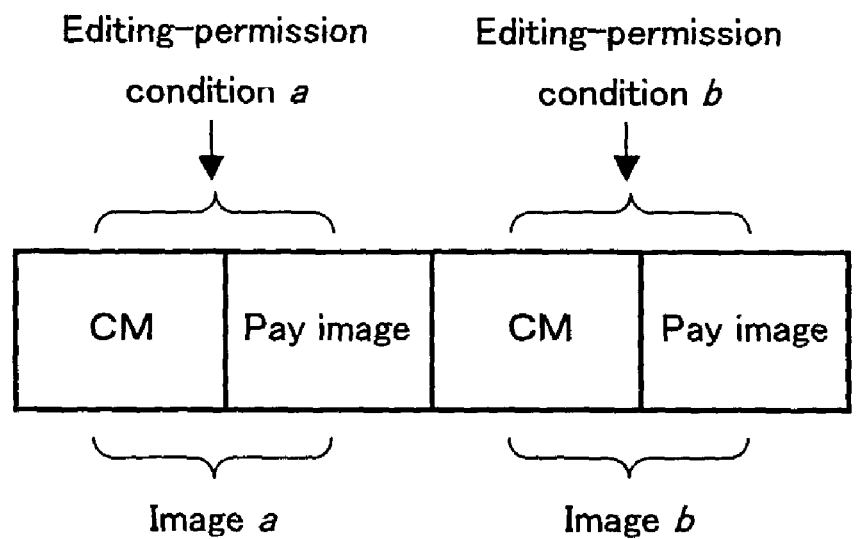
FIG. 13 is the structure of digital-content data utilized in another embodiment.
FIG. 14 is an explanatory diagram of an editing-permission table.

As shown in FIG. 13, in a situation such as in which distributed digital content is image α and image b, each configured with an advertising image and a pay image, editing-permission conditions α and b, which are information as to whether editing of the respective images α and b is permitted or denied, is established.

The editing-permission conditions α and b are administered, as editing-permission information with regard to each user, according to an editing-permission table such as is represented in FIG. 14. With the editing-permission table in FIG. 14, user 1 is permitted to edit image α and image b, while user 2 is permitted to edit image b only.

Figure 15:
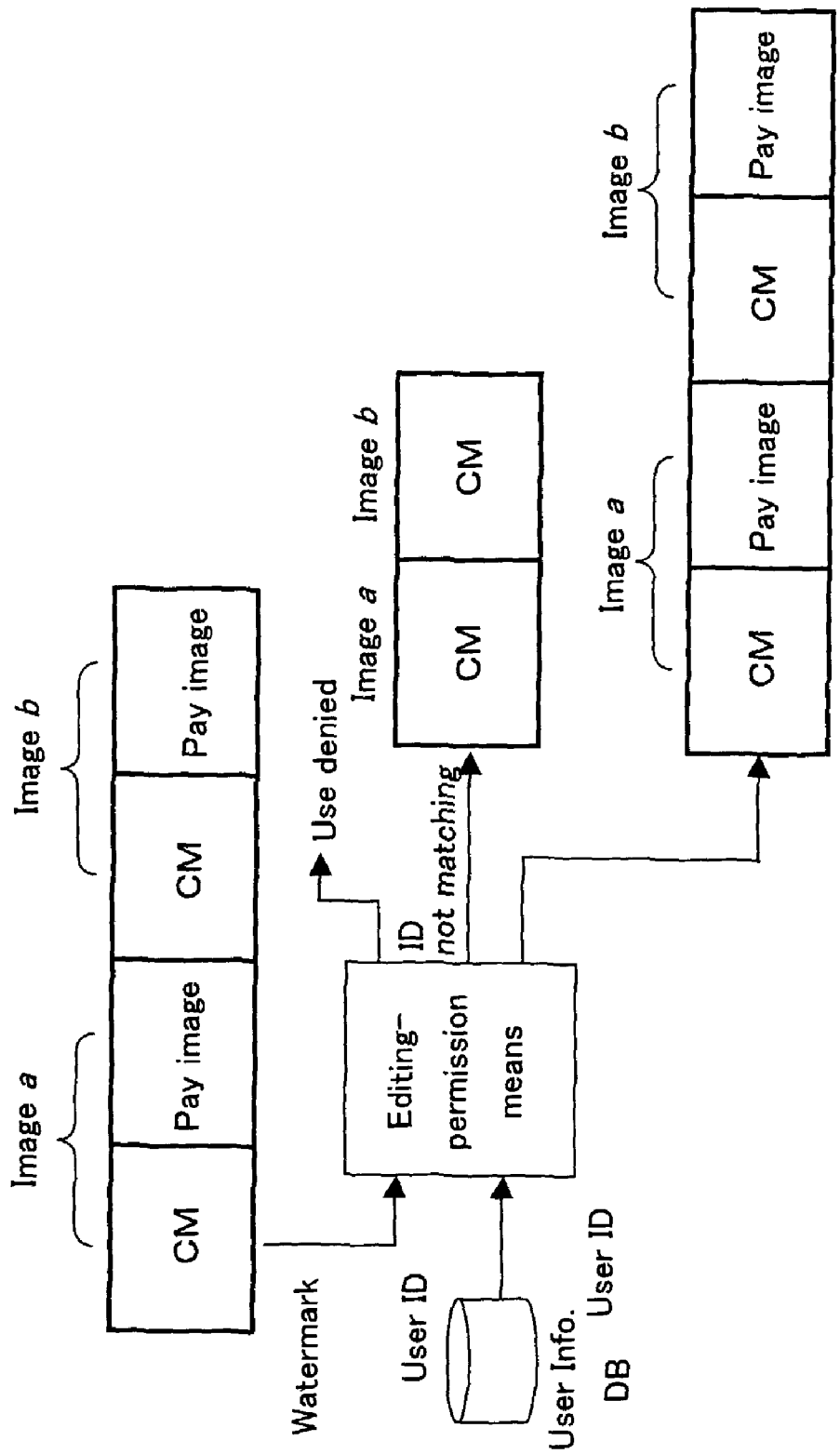
FIG. 15 is an explanatory diagram of a procedure for permitting the editing of distributed image data.

In a situation in which administering an editing-permission table of this sort controls use by controlling the editing of image data by users, the users can be made to use the digital content according to a procedure as indicated in FIG. 15.

Use control in terms of the editing of image data can be carried out via a dedicated application installed on the computer terminal a user is using; a terminal in which such an application is loaded with be referred to herein as an editing-permission means.

When an image containing respective advertising and pay portions is inputted, the editing-permission means, according to a procedure likewise as with FIG. 3, segregates actual image information contained in the actual image portion 110 and data extension information contained in the data extension portion 120, and thereafter divides the data extension information into the encryption image part 121 and the data reproduction information part 122. An encryption key, embedded as an invisible electronic watermark, is then taken out from the actual image contained in each actual image portion 110, whereby the encrypted image contained in the encryption image part 121 is decrypted.

The editing-permission means furthermore accepts user IDs that users input, accesses a user information database that the usage observer 40 (refer to FIG. 1) or the like administers, and consults the use-privilege information that corresponds to an accepted user ID.

In the situation in which a user ID that has been inputted from a user is a void or invalid ID, the editing-permission means denies use of the given image data, and makes an indication to that effect.

In the situation in which a user ID that has been inputted from a user is one for which editing of the given image data is not permitted, the editing-permission means permits only the reproduction of the advertising image within the actual image portion 110.

In the situation in which a user ID that has been inputted from a user is one for which editing of the given image data is permitted, the editing-permission means permits the user to edit the decrypted pay image. Of course, the user is also permitted to reproduce the advertising image; and a configuration that even permits editing of the advertising image is also possible.

Likewise, in a situation in which the structure of the data in distributed digital content is given a configuration made up of an actual image portion, a data extension portion, and a second data extension portion as depicted in FIGS. 11 and 12, also possible is a configuration such that use-privilege information, in connection with an editing process corresponding to editing-permission information established for a user that is to be a distributee, is contained as metadata in the second data extension portion.

In this case use-privilege information that includes information, configured for a user item by item for distributed image data, as to whether editing permission should be given, is put into the second data extension portions 260 and 270; and when there is a demand from a user for the use of image data, use can be controlled in terms of permission to edit the image data, by consulting the use-privilege information contained in the second data extension portions 260 and 270.

For example, if the use-privilege information contained in the second data extension portions 260 and 270 is "editing not allowed," only reproduction of the actual image portions 210 and 230 is permitted. Likewise, with the Type 1 data represented in FIG. 11, if the use-privilege information contained the second data extension portion 260 is "editing allowed," the encrypted data contained in the encryption image part 121 is decrypted, and editing the decrypted image data is permitted. With the Type 2 data represented in FIG. 12, if the use-privilege information contained the second data extension portion 270 is "editing allowed," after decrypting the encrypted data 251 contained in the encryption image part 121, it is composited into the advertising window 240 in the actual image portion 230 and editing of this image data is permitted.

By a data application method having to do with the present invention, an encryption key for when first data for pay images is encrypted is embedded as an invisible electronic watermark within second data, e.g. advertising publicity information, that is unconditionally usable, which makes it possible to maintain the security of the first data at a high level, and by preventing information tampering serves to protect digital data privileges. The method further enables data content evaluation by content users to be gained properly, and enables working toward convenience for content providers when circulating content. Further still, content users are able to get information they desire in only the amount they desire, and the total charges can be kept down to the minimum necessary. In situations in which advertising publicity information is utilized as the second data, the total charges can be kept down even more, further improving the content users' convenience.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A data application method for distributing a digital content including moving-image data, the data application method comprising:

converting, by a processor, first data into encrypted first data by using a plurality of encryption keys, for permitting use of the first data based on predetermined conditions;

generating watermarked second data in which an encryption key is embedded, as an invisible electronic watermark, into the second data, the second data being usable unconditionally;

compositing and distributing the digital content including the encrypted first data and the watermarked second data;

sending use-permission information for the first data to a user in response to a payment of a charge;

discounting the charge in response to a time interval, or a count of times, the second data is used;

determining whether a user that is a distributee of the digital content satisfies the predetermined conditions for using the first data; and if a result of the determining is that the user satisfies the predetermined conditions for using the first data, allowing the user to use the digital content according to an applicable use method, wherein:

first image included in the first data is encrypted with encryption keys that differ image frame by image frame, and a first encryption key with which an initial frame is encrypted is the encryption key embedded into the second data as the invisible electronic watermark;

encryption-key generation information specifying logical operations applied on generated encryption keys and on the first encryption key to generate the encryption keys for a second and succeeding frames is included in image headers of corresponding frames in the second data, which is advertising publicity information, and images composing the digital content include:

the first image and advertising image included in the watermarked second data, which are switched dynamically based on the result of the determining;

storing time administration information based on use time or use counts for each of the data in a predetermined region of data of each of data portions of a digital content; and outputting, in order to administrate billing, the time administration information contained in the predetermined region of a data portion.

2. The data application method set forth in claim 1, wherein based on results of the verification the user is allowed to use the first data by reproducing it.

3. The data application method set forth in claim 1, wherein based on results of the verification the user is allowed to use the first data by editing it.

4. A data application method for distributing digital content including moving-image data, the data application method comprising:

converting, by a processor, first data into encrypted first data by using a predetermined encryption key, for permitting use of the first data based on predetermined conditions;

generating second data usable unconditionally, and third data in which the encryption key is embedded as metadata;

compositing and distributing the encrypted first data, the second data and the third data;

discounting a charge in response to a time interval or a count of times of using the second data;

producing use permission information and sending the use permission information to a user;

receiving and verifying inputs received from the user in response to the use permission information;

dynamically switching displaying of the first data and the second data, which is composed of advertising publicity information, if the inputs responsive to the use-permission information from the user satisfy the predetermined condition;

storing time administration information based on use time or use counts for each of the data in a predetermined region of data of each of data portions of a digital content; and outputting, in order to administrate billing, the time administration information contained in the predetermined region of a data portion.

5. The data application method set forth in claim 4, wherein use-privilege information that includes information as to whether permission to use the first data is granted is included as metadata in the third data.

6. The data application method set forth in claim 5, wherein the use-privilege information includes information as to whether reproducing the first data is allowed.

7. The data application method set forth in claim 5, wherein the use-privilege information includes information as to whether editing the first data is allowed.

8. A data use device for using digital content including encrypted first data into which first data is encrypted by means of predetermined encryption keys, and watermarked second data in which the encryption keys are embedded as invisible electronic watermarks, the data use device comprising:

an encryption-key extraction means for extracting encryption keys from the watermarked second data by a processor of the data use device;

a data decryption means for decrypting, utilizing encryption keys extracted by said encryption-key extraction means, the encrypted first data into the first data;

an authentication means for verifying whether or not a user meets predetermined conditions for using the first data; and data output means for reproducing the decrypted first data as output by said decryption means or reproducing the second data as output, based on user instructions and on results of verification by said authentication means;

time-administration-information recording means for storing, in a predetermined region of data portions included in digital content having been distributed, time administration information based on use times or use counts for each of the data portions;

time-administration-information output means for outputting, in order to administrate billing, the time administration information contained in the predetermined region of the data of each of the data portions, wherein each data portion of the digital contents includes a first image and a second image, which is composed of advertising publicity information, said time-administration-information recording means embeds, as an invisible electronic watermark in second data of each data portion, time administration information for the each of the data portion, and said data output means switches between a first image included in the first data or a second image included in the second data.

9. The data use device set forth in claim 8, further comprising a tampering detection means for comparing time administration information contained in the predetermined region of the data with reference information on use status that all the data possesses and inspecting for presence/absence of tampering.

10. The data use device set forth in claim 8, wherein said authentication means accesses a usage monitoring server that administrates administration information including permission information for all of the data, and performs verification of the permission information by consulting the administration information on the usage monitoring server.

11. The data use device set forth in claim 8 further comprising an editing-permission means for, based on results of verification by said authentication means, permitting editing of the first data.

12. A non-transient computer readable medium storing a computer product for a data use device using digital content including encrypted first data into which first data is encrypted by means of predetermined encryption keys, and watermarked second data in which the encryption keys are embedded as invisible electronic watermarks, the computer product causing a computer to function as a data use device comprising:

encryption-key extraction means for extracting encryption keys from the watermarked second data by a processor of the computer;

data decryption means for decrypting, utilizing encryption keys extracted by said encryption-key extraction means, the encrypted first data into the first data;

authentication means for verifying whether or not a user meets predetermined conditions for using the first data;

data output means for reproducing the decrypted first data as output by said data decryption means or reproducing the second data as output, based on user instructions and on results of verification by said authentication means, decryption of the first data by encryption-key extraction output and said data decryption means, and time-administration-information recording means for storing, in a predetermined region of each of data portions included in the digital content having been distributed, time administration information based on use times or use counts for the each of the data portions;

time-administration-information output means for outputting, in order to administrate billing, the time administration information contained in the predetermined region of each of the data portions, wherein each data portion of the digital contents includes a first image of the first data and a second image of the second data, the second image being composed of advertising publicity information, said time-administration-information recording means embeds, as an invisible electronic watermark in the second data, the time administration information for each of the data portions and said data output means switches displaying the first image or the second image.

13. A non-transient computer readable storage for controlling a computer to execute a process using digital content including encrypted first data into which first data is encrypted using encryption keys, and watermarked second data in which the encryption keys are embedded as invisible electronic watermarks, the process comprising:

extracting encryption keys from the watermarked second data;

decrypting encrypted first data into the decrypted first data, utilizing the encryption keys extracted by said extracting;

verifying whether or not a user meets predetermined conditions for using the first data ;

reproducing for display the decrypted first data produced by said decrypting and reproducing the second data composed of advertising publicity information by dynamic switching, based on user instructions and on results of said verifying;

storing time administration information based on use time or use counts for each of the data in a predetermined region of data of each of data portions of a digital content;

outputting, in order to administrate billing, the time administration information contained in the predetermined region of a data portion, wherein said storing embeds, as an invisible electronic watermark in the second data, the time administration information for a respective the data portion.

* * * * *

UNITED STATES PATENT AND TRADEMARK OFFICE
CERTIFICATE OF CORRECTION

PATENT NO. : 7,925,882 B2  Page 1 of 1
APPLICATION NO. : 10/364476
DATED : April 12, 2011
INVENTOR(S) : Hideyuki Hirano It is certified that error appears in the above-identified patent and that said Letters Patent is hereby corrected as shown below:

Title Page Column 2 item (56), (Other Publications), Line 9, delete "Limted," and insert -- Limited, --, therefor.

Column 11, Line 51, in claim 1, after "data;" delete "and".

Column 14, Line 41, in claim 13, delete "data ;" and insert -- data; --, therefor.

Signed and Sealed this
Sixth Day of March, 2012

David J. Kappos
*Director of the United States Patent and Trademark Office*